(12) United States Patent
Poeschl (10) Patent No.: US 6,276,620 B1
(45) Date of Patent: *Aug. 21, 2001

(54) MILLING PLANT AND METHOD FOR MILLING RAW MATERIALS

(75) Inventor: Franz Poeschl, Düssldorf (DE)

(73) Assignee: Loesche GmbH, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,954

(22) Filed: Aug. 4, 1999

(30) Foreign Application Priority Data

Aug. 11, 1998 (DE) .............................. 198 36 323

(51) Int. Cl.[7] .............................. B02B 1/00; B02B 11/08
(52) U.S. Cl. .............................. 241/48; 241/57; 241/119
(58) Field of Search .............................. 241/119, 57, 48

(56) References Cited

U.S. PATENT DOCUMENTS

| | | | |
|---|---|---|---|
| 4,461,428 | * | 7/1984 | Williams .............................. 241/34 |
| 4,498,633 | * | 2/1985 | Williams .............................. 241/48 |
| 4,505,435 | * | 3/1985 | Hellwell .............................. 241/79.1 |
| 5,921,479 | * | 7/1999 | Doenges et al. .............................. 241/18 |

FOREIGN PATENT DOCUMENTS 43 06 930    9/1984  (DE) .

OTHER PUBLICATIONS

G. Salewski, "An New Grinding Process for Dry Lignite," Aufbereitungs–Technik vol. 35, Nr. 4 (1994), pp. 181–189.

* cited by examiner

*Primary Examiner*—Allen Ostrager
*Assistant Examiner*—William Hong
(74) *Attorney, Agent, or Firm*—Jacobson Holman, PLLC (57) ABSTRACT

In a mill drying plant with a roller grinding mill and preferably in a cement production plant operated in compound with a clinker burning process and having a kiln fan and a fan downstream of a filter, a mill fan is connected up-stream of the roller grinding mill as a further fan. This makes it possible to overcome the resistance of the roller grinding mill blade ring and to force the pressure zero point into the roller grinding mill, so that there is a low vacuum above the blade ring in the milling and classifying chamber and in the filter.

14 Claims, 6 Drawing Sheets

MILLING PLANT AND METHOD FOR MILLING RAW MATERIALS

FIELD OF THE INVENTION

The invention relates to a milling plant having a roller grinding mill, a classifier and an exhaust gas fan, which follows a filter, particularly a plant for the production of cement, and to a method for cement production in a compound system.

BACKGROUND OF THE INVENTION

In the production of cement raw material mill drying plants are operated in combination with a clinker burning process, in order to supply the exhaust gases formed in a cement rotary kiln, following heat exchangers, to a further heat utilization.

Figure 3:
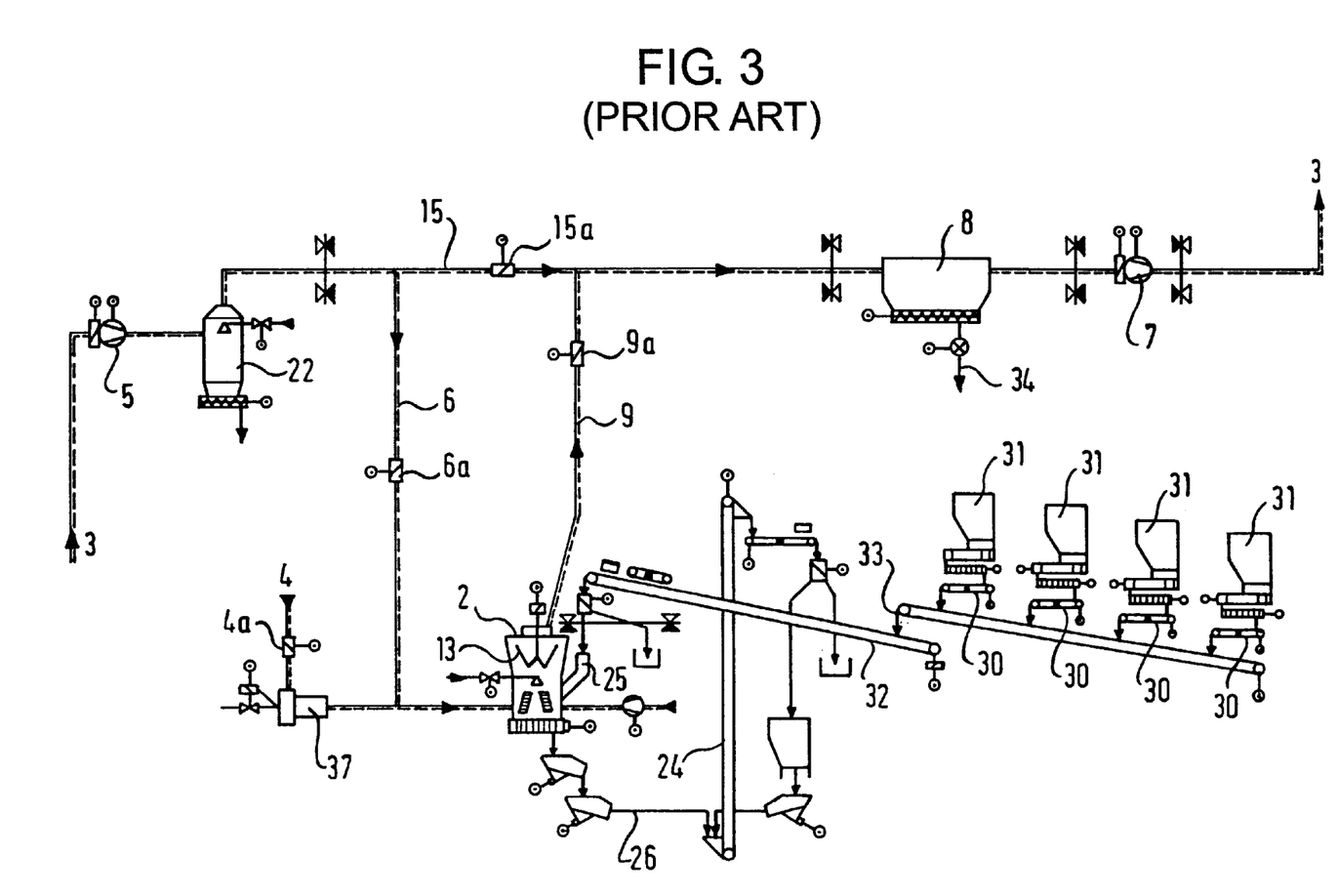
FIGS. 3 and 4 is a plant and circuit diagrams of mill drying plants according to the prior art.

A known milling system can be gathered from a circuit diagram according to FIG. 3. Exhaust gases 3 from a calcining process are supplied by a kiln fan 5 into an exhaust gas pipe 6, via a shutoff device 6a to a roller grinding mill 2. The term kiln fan 5 is used here to define the fan feeding a gas flow to a mill. In combined circuits of cement rotary kilns and heat exchangers with an air-swept roller grinding mill, the kiln or kiln/heat exchanger-fan supplies the kiln gas flow and heat flow to a roller grinding mill, e.g. an air swept roller grinding mill. The term mill fan is used to define the fan, which delivers the gas flow necessary for the mill and which as fan 7 is positioned in the flow direction below the filter 8 functioning as a dust separator. Said fan 7 supplies the exhaust gas 3 with fines or meal 34 produced in the roller grinding mill 2, by means of a dust-exhaust gas pipe 9, which contains a shutoff device 9a, to the filter 8. The fines 34 separated in the filter 8 are delivered by means of not shown conveying systems into silos. The dust-freed exhaust gas 3 is supplied with the aid of the fan 7 following the filter 8 to a not shown chimney flue and ejected.

In a compound operation, in which the milling plant is operated on line with a not shown cement rotary kiln, a shutoff device 15a in a bypass line 15 remains closed. Unusable thermal energy is dissipated in a cooling tower 22, which generally follows the kiln fan 5, or in the roller grinding mill 2, e.g. by water injection.

Individual components of a raw material mixture 33 are supplied from bunkers 31 by means of weighting belts 30 to a feed belt 32 and fed to the roller grinding mill 2. The feed device can be constituted by a flap lock 25, which acts as an air excluder. Coarse material 26 separated in the roller grinding mill 2 is at least partly admixed with the raw material mixture 33 by means of a conveying machinery 24 and is supplied again to the roller grinding mill 2.

In combined operation the milling plant according to FIG. 3 is operated in such a way that the pressure-zero point, i.e. the point of atmospheric pressure, is located shortly upstream of the entry of the exhaust gases into the roller grinding mill 2, so that said grinding roller mill 2, an integrated classifier 13 and the filter 8 operate under a relatively high sub-atmospheric pressure and corresponding sealing mechanisms and stable structures are required, which will be discussed hereinafter.

In direct operation the milling plant according to FIG. 3 is out of action and only the not shown cement rotary kiln is operated. In combined operation the dust produced by the mill 2 and the residual dust from the heat exchanger are separated in the filter 8, so that the term "filter plant" is used. However, in direct operation only the residual dust from the exhaust gas 3 from the not shown heat exchanger is separated. The shutoff device 6a in the exhaust gas pipe 6 and the shutoff device 9a in the dust-exhaust gas pipe 9 are then closed and the exhaust gas flow 3 from the calcining process, following the cooling tower 22, is passed directly via the bypass line 15 into the filter 8, where it is dedusted and fed by means of the following fan 7 and a not shown chimney flue into the atmosphere. In direct operation the fan 7 serves as an exhaust gas fan for the heat exchanger.

For the production of cement raw material independently of the calcining process, e.g. when the cement rotary kiln is out of action or on recommissioning, as no exhaust gas is available, fresh air 4 is supplied by means of a control flap 4a and a hot gas generator 37 to the roller grinding mill 2. The shutoff devices 6a and 15a in the exhaust gas pipe 6 and bypass line 15 are then closed, whereas the shutoff device 9a in the dust exhaust gas pipe 9 between roller grinding mill 2 and filter 8 is opened.

Figure 4:
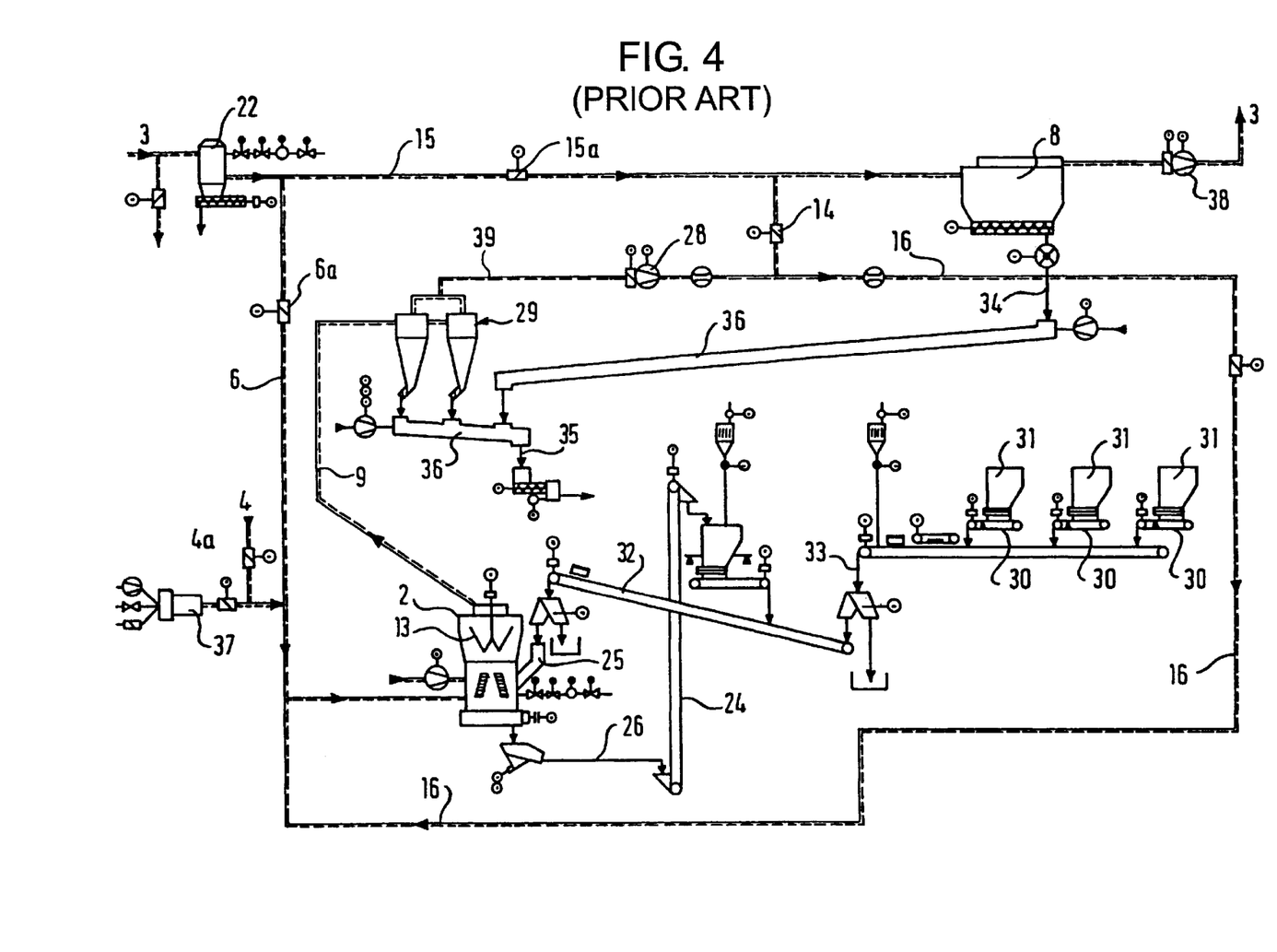

FIG. 4 shows a circuit diagram of a further raw material mill drying system, which is also known as the "three-blower version". For identical features the same reference numerals as in FIG. 3 are used. A first blower, which corresponds to the kiln fan 5 of FIG. 3, but which is not shown, is located in the flow direction upstream of a cooling tower 22 and feeds the exhaust gases 3 from the calcining process to a roller grinding mill 2. A second blower 28, which acts as a mill fan, is located downstream of a multiple-unit cyclone 29 and feeds a partial gas flow, via a return line 16 back into the roller grinding mill 2. The remaining exhaust gas part from the multiple-unit cyclone 29 is supplied by means of a control and shutoff device 14 to a filter 8. The filter 8 is followed by a third blower 38 as exhaust gas fan and which feeds the remaining exhaust gases 3 into a not shown chimney flue as filter exhaust gas. The fines 34, 35 separated in the multiple-unit cylone 29 and in filter 8 are supplied by corresponding conveyer mechanisms 36 to a not shown silo. Reference is made to the remarks concerning FIG. 3 in connection with the devices for the production and supply of a raw material mixture 33 to the roller grinding mill 2.

The mill drying plant according to FIG. 4 can operate independently of the gas and thermal balance of the compound system. By means of a bypass line 15 excess exhaust gas and heat flows from the kiln and calcining process can be bypassed the roller grinding mill 2 with classifier 13 and multiple-unit cyclone 29 and can be dedusted together with the exhaust gases from the roller grinding mill 2 in the following filter plant 8.

Figure 6:
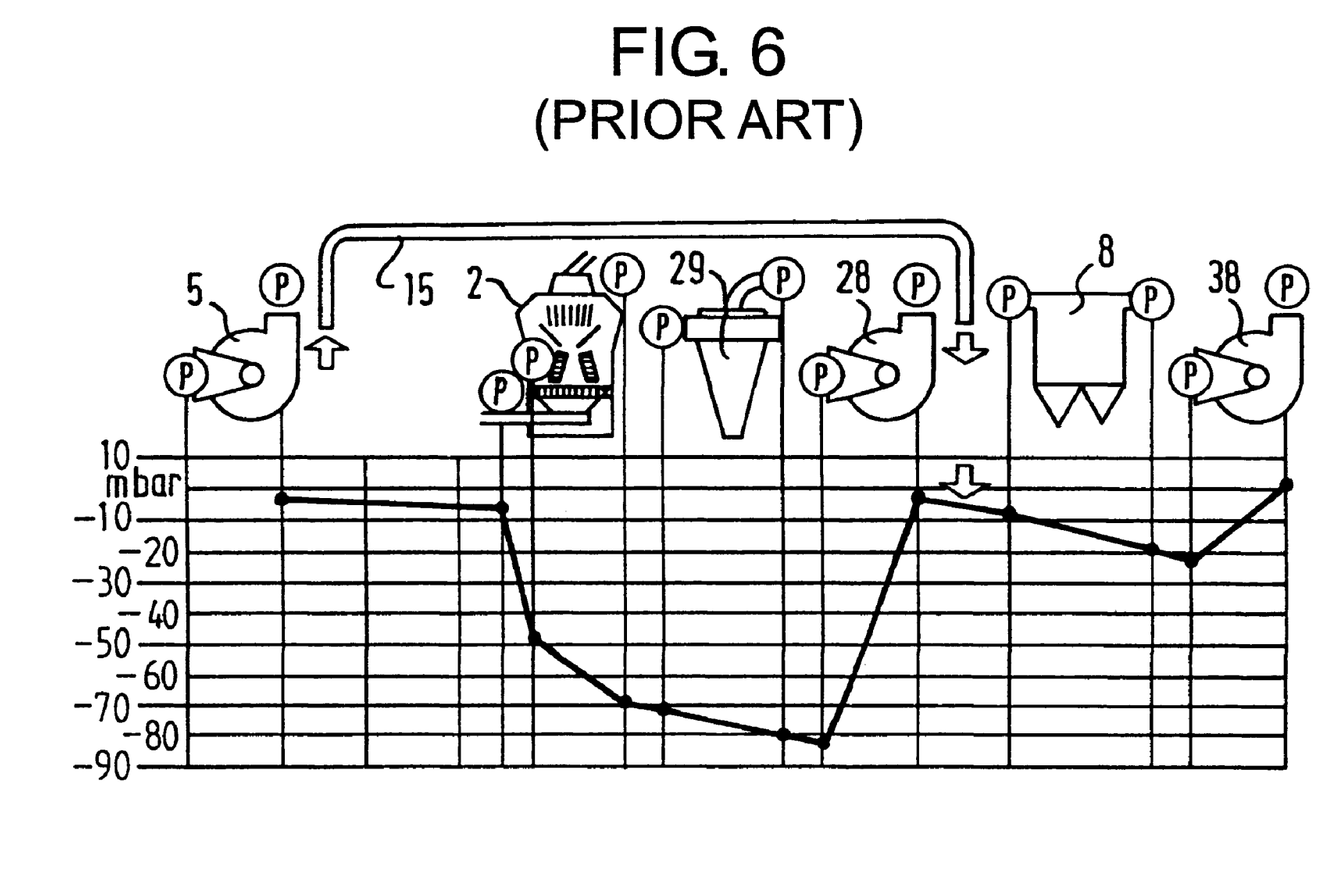

FIG. 6 shows an exemplified pressure curve of the combined circuit variant of the plant of FIG. 4. The essential devices with the corresponding association are shown above the pressure curve and given the reference numerals of FIG. 4. FIG. 6 shows that the filter 8 operates in a relatively low sub-atmospheric pressure range and therefore only has to be protected against air infiltrations by relatively limited expenditure. However, the roller grinding mill 2, which is operated with a vacuum of about −50 to −80 mbar, must be virtually "hermetically" sealed to avoid air infiltrations.

Disadvantages also result from the multiple-unit cyclone 29, which is associated with relatively high construction and space consumption costs and is subject to wear, so that there are also high maintenance costs.

A high degree of separation in the multiple-unit cyclone 29 also requires relatively high energy costs and a further disadvantage of the known plant is the splitting up of the end product into coarser fines 35 from the cyclones and finer fines 34 from the filter 8 (FIG. 4).

The flexibility of the milling plant is limited, because the separation level of the multiple-unit cyclone 29 is coupled with the load state (=gas flow) of the mill. The cyclone separation level drops in the case of a partial load, so that there is a rise in the residual dust content in the line 39 following the multiple-unit cyclone 29 to the mill fan 28, which leads to wear phenomena.

Although admittedly the mill drying plant according to FIG. 3 has a simpler pipe layout, lower energy costs and relatively low capital costs due to a compact plant construction. As can be seen from the exemplified pressure curve of the compound circuit variant of the plant according to FIG. 3 shown in FIG. 5, the filter 8 is incorporated into the vacuum range of the roller grinding mill 2, which is approximately −70 to −90 mbar and must therefore be correspondingly designed from the construction and safety standpoints. Filter housings are of considerable size in industrial milling plants. The filter housing must be designed for operational vacuums of almost −100 mbar and for a cold air start to −140 mbar for safety reasons. Considerable constructional and production measures are necessary to achieve the necessary rigidity and prevent a collapse. Even as a result of small cracks in the housing, the following mill fan 7 sucks secondary air into the plant, which acts as a loss on the mill exhaust gas and leads to functional problems.

Pressure fluctuations, which are unavoidable in the enlarged vacuum range, lead to high mechanical loading of the filter housing and to a high susceptibility to cracking and therefore air infiltrations. These directly influence the capacity of the roller grinding mill. In addition, the not "hermetically" sealed points of the roller grinding mill and the classifier, together with corresponding areas in the overall system are potential sources for air infiltrations. The damage points can also not be located from the outside due to a closed insulation.

Another disadvantage is that the exhaust gases 3 must be drawn out of the heat exchanger unit of the calcining process during compound operation through the roller grinding mill 2 and a bypassing of the exhaust gases is impossible (cf. also FIG. 3).

The gas temperature in the dedusting filter 8 cannot be kept independent of the mill exhaust gas temperature. This dependence can alone and together with air infiltrations lead to a local dropping below the dew point and therefore to corrosion in the filter and pipe area. During mill operation no other gases than those from the roller grinding mill 2 can be dedusted.

SUMMARY OF THE INVENTION

The object of the invention is to provide a milling plant and a method for the milling of raw materials, particularly a cement production plant and a method, which with a particularly low capital and maintenance costs ensure a variable method performance and an extremely efficient milling process and in particular an efficient cement production.

From the apparatus standpoint, this object is achieved by a milling plant, e.g. by a plant for the production of cement with a roller grinding mill, a cement rotary kiln with a heat exchanger unit, a kiln fan and an exhaust gas fan downstream of a filter, in which a mill fan is positioned upstream of the roller grinding mill and overcomes the high resistance of the roller grinding mill blade ring and forces an exhaust gas or also air flow through the roller grinding mill blade ring necessary for a mill drying process and, in cooperation with the exhaust gas fan, permits an advantageous pressure curve upstream, within and downstream of the roller grinding mill and extending to the filter.

From the method standpoint, according to the invention the prepositive mill fan positioned upstream of the mill forces the pressure zero point, i.e. the atmospheric pressure into the roller grinding mill and operationally reliably held in the area of the blade ring and milling pan, particularly in an upper area of the blade ring and extending to an upper edge of the milling pan. In the milling chamber of the roller grinding mill above the milling pan and blade ring, including at the passages for the levers and/or spring rods, in the classifier and in the filter, a minimum sub-atmospheric pressure is set by means of the exhaust gas fan, whereas in the flow direction upstream of the blade ring, particularly in the lower part of the mill, an overpressure is produced by the mill fan.

Since, according to the invention, lower sub-atmospheric pressure levels can be set than in the known mill drying plants, it is advantageously achieved that it is possible to move away from the known, stable costly constructions of the filter or cyclones and further milling plant equipment and a considerable percentage of the air infiltration sources is eliminated.

The disposition of a mill fan upstream of a roller grinding mill is known per se from coal milling plants. However, in that case the mill fan is the sole fan in the coal milling system. In addition, the milling chamber, classifying chamber and e.g. the following burner lines and coal dust/air mixture burners are under an overpressure.

According to the invention, the upstream mill fan in a compound cement raw material milling plant with mill drying process serves to displace the pressure level in such a way that in cooperation with the exhaust gas fan in the mill interior there is a much lower sub-atmospheric pressure extending to ambient pressure. The total capacity of the fans of the mill drying plant, i.e. the mill fan and exhaust gas fan downstream of the filter system, is distributed over the fans and is lower due to the reduced air infiltrations.

The lower part of the mill is under an overpressure. The filter can be operated with a much lower vacuum than in the prior art in accordance with the circuit of FIG. 3.

Thus, the construction of the filter housing for absorbing the surface pressure can be significantly simplified in avantageous manner.

The gas flow through the roller grinding mill is controlled by the upstream mill fan. It is advantageous that the control of a bypass exhaust gas flow can be brought about without difficulty by the exhaust gas fan due to the smaller pressure gradient to the filter. Due to the reduced pressure level upstream of the filter, it is also possible to connect dedusting devices to the line between the roller grinding mill and the filter.

Essential advantages of the plant and method according to the invention with a clearly defined pressure curve in the mill system are the omission of complicated seals against air infiltrations in the roller grinding mill, e.g. in the material feed area, energy savings due to the air infiltrations which no longer occurs, reduced capital and operating costs, together with flexible method performance in combination and the possibility of being able to dedust other exhaust gases in the same filter plant. A considerable cost saving more particularly results from the lighter construction of the filter housing and the omissions of cyclones.

Besides the economies in capital expenditure, maintenance costs and costs for increased energy consumption are avoided.

The invention cannot only be used with advantage for cement raw material milling plants. It falls within the scope of the invention to operate a milling plant without any upstream process, e.g. a so-called central milling plant, using an upstream mill fan, in order to displace the pressure level from the sub-atmospheric pressure to the overpressure range into the milling chamber of the roller grinding mill and to produce a vacuum by an exhaust gas fan following the filter. Considered in the flow direction, the lower milling chamber up to the suction connection of the exhaust gas fan is under a lower vacuum than in conventional milling plants.

The advantages are as in the case of a cement raw material milling plant, namely considerable energy and capital cost savings, the avoiding of air infiltrations, maintenance costs, and a variable method performance.

An inventive milling plant, in which an upstream mill fan cooperates with an exhaust gas fan, can be used for milling the most varied raw materials such as clinker, metallurgical sand, coal and all other mineral and rock types.

In the so-called filter plants, the use of a fan upstream of the mill means that there is a further fan besides the exhaust gas fan. In the hitherto conventional filter plants the fan, positioned behind the filter, acts both as a mill fan and as an exhaust gas fan. The above-described advantages of the modified pressure level (MPL) process performable with an upstream mill fan make the additional costs of a fan appear extremely small.

BRIEF DESCRIPTION OF THE DRAWINGS

The invention is described hereinafter relative to the attached drawings.

DETAILED DESCRIPTION OF THE DRAWINGS

Figure 1:
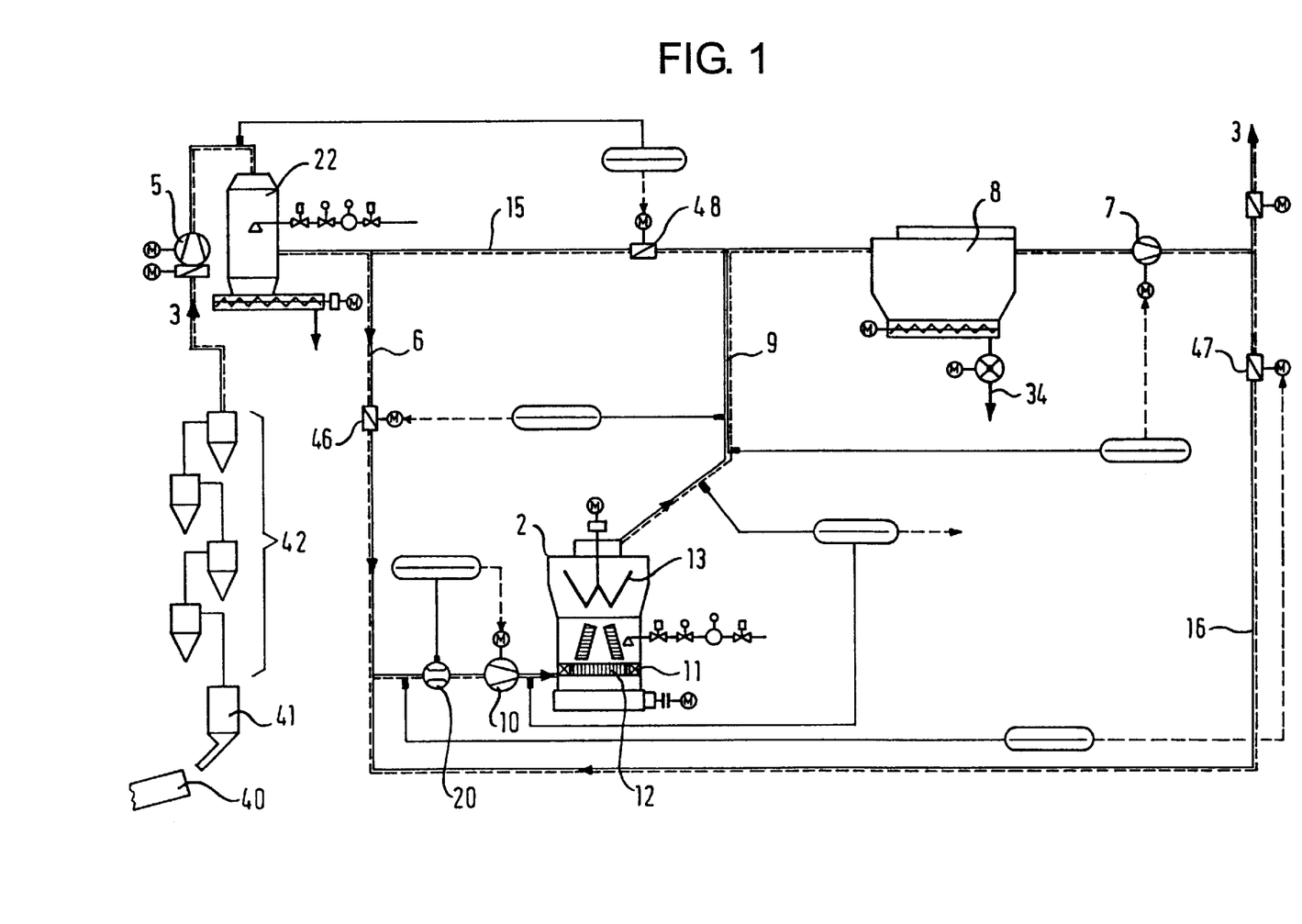
FIG. 1 is a plant diagram of a milling plant according to the invention.

FIG. 1 shows a circuit diagram of a plant for cement production with a calcining process and a mill drying process.

Exhaust gases 3 from a cement rotary kiln 40 are supplied by means of a precalciner 41, a heat exchanger unit 42 and a kiln fan 5 as well as a cooling tower 22 in an exhaust gas pipe 6 to a mill drying process with a roller grinding mill 2 and a filter 8. A bag or electrostatic filter can be used as filter 8.

Upstream of the roller grinding mill 2 with a milling pan 12 and a blade ring 11 or nozzle ring in a milling chamber and an integrated classifier 13 in a classifying chamber is provided a mill fan 10 or mill blower, with which it is possible to raise the pressure level in the regions of the roller grinding mill 2 and filter 8.

The overall capacity of the milling plant is distributed over the upstream mill fan 10 and exhaust gas fan 7 and is lower instead of higher, due to the reduced air infiltrations.

The upstream mill fan 10 forces the exhaust gas flow necessary for the mill drying process through the blade ring 11 and consequently prevents the latter acting as a resistance for the exhaust gas fan 7 and a high vacuum gradient to the atmosphere in the upper part of the mill and the following plant parts, particularly in filter 8 is built up. The higher said vacuum rises, the more secondary air can be sucked into the system and the less exhaust gas is drawn through the blade ring 11.

Through the pressure level displacement the secondary air percentage in the system is significantly reduced. Apart from the energy and method advantages, the housing of the filter 8 can be made lighter and therefore less expensively.

The exhaust gas pipe 6 contains a control and shutoff device 46, e.g. a throttle valve, which permits a bypassing of the exhaust gases 3 via a bypass line 15 and a dedusting in filter 8 and not only when the roller grinding mill 2 is not operating.

In front of the upstream mill fan 10 is located a gas flow measuring device 20, whose measured values are used for controlling the mill fan 10.

The devices and plant parts for producing a raw material mixture and supply and feed devices for the roller grinding mill 2 are not shown in FIG. 1 and can be constructed as in the plants of FIGS. 3 and 4.

A dust-exhaust gas pipe 9 leads from the roller mill 2 to the filter 8. The fines 34 separated in the filter 8 are conveyed to silos by not shown conveying mechanisms. The dedusted exhaust gas 3 can at least partly be returned by means of a return line 16 to the mill fan 10 of the roller grinding mill 2. If a controllable shutoff device 47 in the return line 16 is closed, the dedusted exhaust gases 3 are passed via a chimney flue into the atmosphere. FIG. 1 shows possibilities for controlling the shutoff and control device 46 in the exhaust gas pipe 6, a control and shutoff device 48 in bypass line 15, the control and shutoff device 47 in return line 16 and in the dust-exhaust gas pipe 9.

Figure 2:
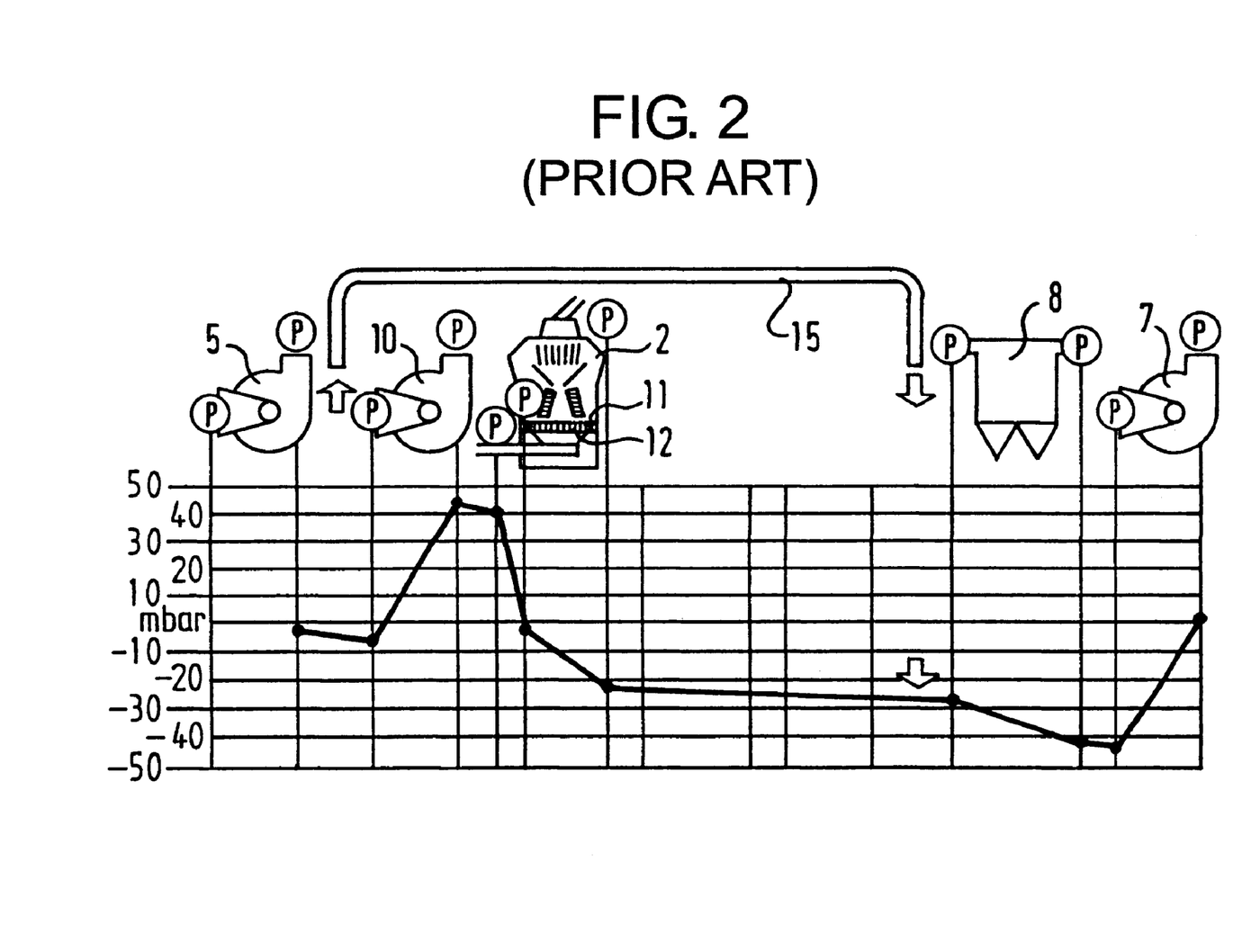
FIG. 2 is a diagrammatic representation of an exemplified pressure curve of the inventive compound circuit variant of FIG. 1.

The clearly defined pressure curve, which can be obtained with an upstream mill fan 10 in cooperation with an exhaust gas fan 7 in the mill drying plant according to FIG. 1 is shown in exemplified manner in FIG. 2.

Figure 5:
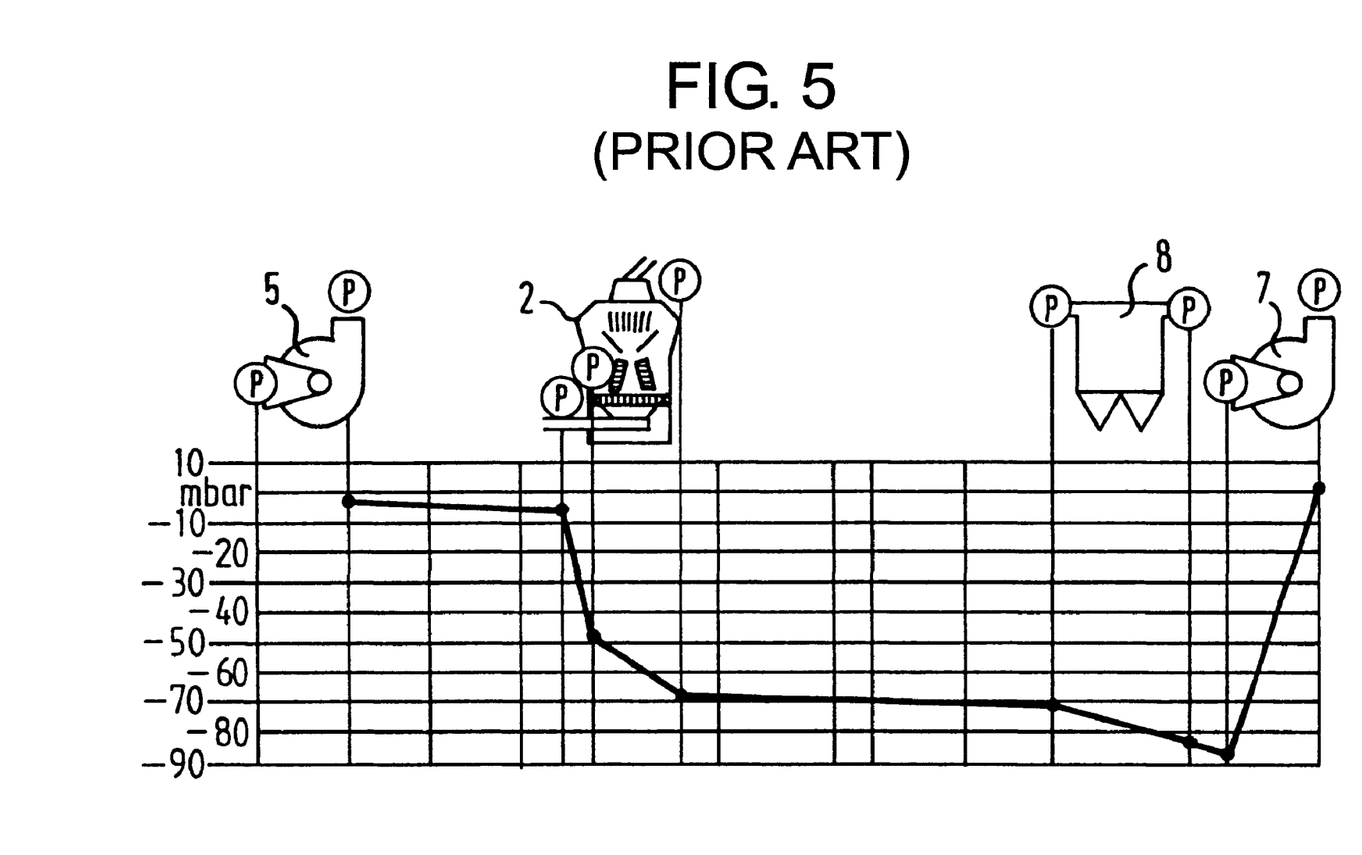
FIGS. 5 and 6 are pressure curves of the plant and circuit diagrams of FIGS. 3 and 4.

Above the pressure curve are shown the essential plant parts, namely a kiln fan 5, the upstream mill fan 10, the roller grinding mill 2, the filter 8 and the exhaust gas fan 7. FIG. 2 illustrates the modified pressure level upstream, within and downstream of the roller grinding mill 2 and in the filter 8. A comparison with the exemplified pressure curves of the known plant systems, shown in FIGS. 5 and 6, illustrates that in the known milling systems directly prior to the entry of the gas flow into the roller grinding mill 2 there is a vacuum of approximately −5 to −7 mbar and in the roller grinding mill 2 a vacuum of −50 to −70 mbar. The vacuum in the electrostatic filter in the known plant according to FIGS. 3 and 5 of around −90 mbar is particularly disadvantageous.

FIG. 2 illustrates that with the upstream mill fan 10 directly upstream of the roller grinding mill 2 or in the lower part of the mill and upstream of the blade ring 11, it possible to set an overpressure, e.g. of approximately 40 mbar. Operationally the pressure zero point is in an upper area of the blade ring 11 and extending to an upper edge of the milling pan 12. In the milling and classifying chamber in the example of FIG. 2 there is a vacuum of approximately −3 to −25 mbar and in the filter 8 only a vacuum of approximately −40 mbar.

The modified pressure level (MPL) method according to the invention is consequently characterized by a displaced pressure level upstream, within and downstream of the roller grinding mill 2, which is achieved with the upstream mill fan 10 in cooperation with the exhaust gas fan 7 and which leads to extraordinary savings of capital, energy and maintenance costs and to a particularly efficient crushing of raw materials and in particular to efficient cement production.

What is claimed is:

1. Milling plant with a roller grinding mill, particularly an air-swept roller mill, having a milling pan, a blade ring, a classifier, a filter, and a dust-gas pipe between the filter and the roller grinding mill, and having an exhaust fan, located downstream of the filter and supplying a sub-atmospheric pressure to the filter, the roller grinding mill and the dust-gas pipe, wherein a mill fan is positioned upstream of the roller grinding mill and forces the necessary gas flow into the roller grinding mill and wherein the mill fan in cooperation with the exhaust fan are capable of setting a predeterminable pressure level upstream, within and downstream of the roller grinding mill and wherein the pressure zero point can be located in the area of the blade ring and milling pan.

2. Milling plant according to claim 1, wherein the mill fan is upstream of the roller grinding mill and the pressure zero point can be located in the area of the blade ring and milling pan.

3. Plant according to claim 2, wherein the pressure zero point or a minimal sub-atmospheric pressure can be set in an upper area of the blade ring extending to an upper edge of the milling pan.

4. Plant according to claim 3, wherein with the upstream mill fan upstream and within the roller grinding mill below the blade ring can be set an overpressure and above the milling pan and in the classifier which is integrated into the roller grinding mill can be set a sub-atmospheric pressure.

5. Plant according to claim 4, wherein a sub-atmospheric pressure can be set in the filter which has a relatively lightweight housing construction.

6. Plant according to claim 5, wherein the roller grinding mill has simplified seals in the area of the raw material feed and passages of moving parts through the mill housing.

7. Plant according to claim 6, wherein between the roller grinding mill and filter dedusting devices can be connected to the dust-exhaust gas pipe.

8. Plant according to claim 7, wherein for the production of cement, the roller grinding mill is in a compound circuit with a cement rotary kiln, a heat exchanger unit and a kiln fan, which is positioned downstream of a heat exchanger unit and supplies the exhaust gases from the cement rotary kiln to an exhaust gas pipe and that with the mill fan positioned upstream of the roller grinding mill a necessary exhaust gas flow can be supplied to the roller grinding mill for setting a predeterminable pressure level upstream, within and downstream thereof.

9. Plant according to claim 8, wherein there is a bypass line for supplying exhaust gases from the cement rotary kiln to the filter and that the bypass line branches off in the flow direction from the exhaust gas pipe upstream of a control and shutoff device.

10. Plant according to claim 9, wherein the exhaust gas flow to the filter can be conditioned largely independently of the gas flow through the roller grinding mill with respect to the volume flow and gas temperature.

11. Plant according to claim 10, wherein for the return of controllable exhaust gas flows to the roller grinding mill, a return line is positioned downstream of the filter.

12. Plant according to claim 11, wherein control and shutoff devices are located in the exhaust gas pipe, as well as in the bypass line and return line.

13. Plant according to claim 8, wherein a gas flow measuring device is located in the supply line to the roller grinding mill upstream of the mill fan.

14. Milling plant with a roller grinding mill, particularly an air-swept roller mill, having a milling pan, a blade ring, a classifier, a filter, and a dust-gas pipe between the filter and the roller grinding mill, and having an exhaust fan, located downstream of the filter and supplying a sub-atmospheric pressure to the filter, the roller grinding mill and the dust-gas pipe, wherein a mill fan is positioned upstream of the roller grinding mill and forces the necessary gas flow into the roller grinding mill, wherein the mill fan in cooperation with the exhaust fan are capable of setting a predeterminable pressure level upstream, within and downstream of the roller grinding mill, wherein the pressure zero point can be located in the area of the blade ring and milling pan, wherein a gas flow measuring device is located in the supply line to the roller grinding mill upstream of the mill fan, and wherein for the return of controllable exhaust gas flows to the roller grinding mill, a return line is positioned downstream of the filter.

* * * * *

UNITED STATES PATENT AND TRADEMARK OFFICE
CERTIFICATE OF CORRECTION

PATENT NO.   : 6,276,620 B1                                              Page 1 of 1
DATED        : August 21, 2001
INVENTOR(S)  : Franz Poeschl It is certified that error appears in the above-identified patent and that said Letters Patent is hereby corrected as shown below:

Drawings,
In Figure 2, delete the label "(PRIOR ART)".

Signed and Sealed this

Fourteenth Day of October, 2003

JAMES E. ROGAN
*Director of the United States Patent and Trademark Office*